(12) United States Patent
Huang et al.

(10) Patent No.: US 8,717,967 B2
(45) Date of Patent: May 6, 2014

(54) DETERMINING CHANNEL CONFIGURATIONS

(75) Inventors: Rui Huang, Beijing (CN); Ping Wang, Beijing (CN)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 13/521,402

(22) PCT Filed: Aug. 25, 2011

(86) PCT No.: PCT/US2011/049237
§ 371 (c)(1),
(2), (4) Date: Jul. 10, 2012

(87) PCT Pub. No.: WO2012/060922
PCT Pub. Date: May 10, 2012

(65) Prior Publication Data
US 2013/0208648 A1    Aug. 15, 2013

Related U.S. Application Data

(60) Provisional application No. 61/410,740, filed on Nov. 5, 2010.

(51) Int. Cl.
*H04B 7/204* (2006.01)
(52) U.S. Cl.
USPC ............................ 370/315; 370/254
(58) Field of Classification Search
USPC .................... 370/315, 254; 375/211
See application file for complete search history.

(56) References Cited

U.S. PATENT DOCUMENTS

| 2011/0044391 | A1* | 2/2011 | Ji et al. ........................... 375/260 |
| 2011/0149886 | A1* | 6/2011 | Xu et al. ......................... 370/329 |
| 2012/0069790 | A1* | 3/2012 | Chung et al. ................... 370/315 |
| 2012/0114021 | A1* | 5/2012 | Chung et al. ................... 375/211 |

(Continued)

FOREIGN PATENT DOCUMENTS

KR    10-2010-0097063 A    9/2010

OTHER PUBLICATIONS

International Search Report mailed Feb. 28, 2012 from International Application No. PCT/US2011/049237.

(Continued)

*Primary Examiner* — Ricky Ngo
*Assistant Examiner* — Ben H Liu
(74) *Attorney, Agent, or Firm* — Schwabe, Williamson & Wyatt, P.C.

(57) ABSTRACT

Embodiments of the present disclosure describe methods, computer-readable media and system configurations for wireless communications. A method may include receiving a transmission of a series of symbols, including an index, and determining a plurality of configurations of a physical downlink channel based on the index. In various embodiments, the plurality of configurations of the physical downlink channel may include one or more antenna ports that are reserved for a reference signal. A relay node (RN) may include a processor and a memory storing a plurality of potential combinations of a plurality of configurations of a physical downlink channel. The processor may be configured to receive a transmission of a series of symbols, including an index, and match the index to one of the plurality of potential combinations. A donor evolved NodeB (DeNB) may be configured to encode such an index into a transmission. Other embodiments may be described and/or claimed.

29 Claims, 6 Drawing Sheets

(56) References Cited

U.S. PATENT DOCUMENTS

| | | | |
|---|---|---|---|
| 2012/0128039 A1* | 5/2012 | Kim et al. | 375/211 |
| 2012/0163335 A1* | 6/2012 | Chung et al. | 370/330 |
| 2012/0182931 A1* | 7/2012 | Shen et al. | 370/315 |
| 2012/0201191 A1* | 8/2012 | Seo et al. | 370/315 |
| 2012/0207084 A1* | 8/2012 | Seo et al. | 370/315 |
| 2012/0213147 A1* | 8/2012 | Noh et al. | 370/315 |
| 2012/0218964 A1* | 8/2012 | Park et al. | 370/329 |

OTHER PUBLICATIONS

Nortel, "Control Channel and Data Channel Design for Relay Link in LTE-Advanced," 3GPP TSG-RAN Working Group 1 Meeting #56, R1-090753, Feb. 9-13, 2009. (Retrieved from the Internet on Feb. 17, 2012: < URL: http://WWW.3gpp.org/ftp/tsg_ran/WG1_RL1/TSG1_56/Docs >) See section 2.

Panasonic, "DM-RS for R-PDCCH and R-PDSCH," 3GPP TSG-RAN WG1 Meeting 59, R1-094515, Nov. 9-13, 2009. (Retrieved from the Internet on Feb. 17, 2012: < URL:http://www.3gpp.org/ftp/tsg_ran/WG1_RL1/TSG1_59/Docs >).

RAN WG1, "LS on physical layer parameters for relay-specific advancements to be configured by higher layers," 3GPP TSG RAN WG1 Meeting #62bis, R1-105819, Oct. 11-15, 2010, Xian, China.

LTE, "3rd Generation Partnership Project; Technical Specification Group Radio Access Network; Evolved Universal Terrestrial Radio Access (E-UTRA); Physical layer for relaying operation (Release 10)," 3GPP TS 36.216 V10.0.0 (Sep. 2010).

RAN1, "WF on Multiplexing Un DL Data and DL Grant," TSG-RAN WG1 Meeting #61, R1-103400, Agenda item: 6.6.1.2., May 10-14, 2010, Montreal, Canada.

Nokia et al., "Proposal on non-interleaving R-PDCCH," TSG-RAN WG1 Meeting #62b, R1-105816, A.I. 6.6.1, Oct. 11-15, 2010, Xi'an, China.

International Preliminary Report on Patentability mailed May 16, 2013 from International Application No. PCT/US2011/049237.

* cited by examiner

| INDEX (4 bits) | LEGACY PARAMETERS | | | | RESERVED ANTENNA PORTS |
|---|---|---|---|---|---|
| | RPDCCH-demodulationRs | R-PDCCH-interleaved | R-PDCCH resourceAllocation-Type | | |
| 0 |  |  | 0 | 0 | {7, 8} |
| 1 | USRS | NON-INTERLEAVED | 0 | 1 | {7, 8} |
| 2 |  |  | 1 | 0 | {7, 8} |
| 3 |  |  | 0 | 0 | NA |
| 4 | USRS | INTERLEAVED | 0 | 1 | NA |
| 5 |  |  | 1 | 0 | NA |
| 6 |  |  | 0 | 0 | NA |
| 7 | CRS | NON-INTERLEAVED | 0 | 1 | NA |
| 8 |  |  | 1 | 0 | NA |
| 9 |  |  | 0 | 0 | NA |
| 10 | CRS | INTERLEAVED | 0 | 1 | NA |
| 11 |  |  | 1 | 0 | NA |
| 12 |  |  | 0 | 0 | {7, 8, 9, 10} |
| 13 | USRS | NON-INTERLEAVED | 0 | 1 | {7, 8, 9, 10} |
| 14 |  |  | 1 | 0 | {7, 8, 9, 10} |
| 15 | NA | NA | NA | NA | NA |

Fig. 4

DETERMINING CHANNEL CONFIGURATIONS

CROSS REFERENCE TO RELATED APPLICATIONS

The present application is a national phase entry under 35 U.S.C. §371 of International Application No. PCT/US2011/49237, filed Aug. 25, 2011, entitled "Determining Channel Configurations", which designates the United States of America, and which claims priority to U.S. Provisional Patent Application No. 61/410,740, entitled "Advanced Wireless Communication Systems and Techniques," filed Nov. 5, 2010, the entire contents and disclosures of which are hereby incorporated by reference in their entireties.

TECHNICAL FIELD

Embodiments of the present invention relate generally to the field of wireless transmission, and more particularly, to the determination of channel configurations.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure. Unless otherwise indicated herein, the approaches described in this section are not prior art to the claims in the present disclosure and are not admitted to be prior art by inclusion in this section.

The 3GPP Long Term Evolution ("LTE") Release 10 (March 2011) (the "LTE Standard") provides for an evolved packet system ("EPS"). An EPS may include an evolved universal terrestrial radio access network ("E-UTRAN") and an evolved packet core ("EPC").

LTE Releases 10 and later are known as LTE Advanced ("LTE-A"). LTE-A provides for the deployment of a relay node ("RN") in an E-UTRAN. The RN may be between user equipment ("UE") and an evolved NodeB ("eNB") serving the RN, called the "donor" eNB, or "DeNB." The DeNB may in turn be in communication with components of an EPC, such as a mobile management entity ("MME") and/or a gateway (such as a serving gateway, or "SGW").

Various nodes of an EPS may communicate using various logical interfaces. For example, an eNB may communicate with an MME/SGW over an S1 interface. An eNB may communicate with a DeNB over an X2 interface. An RN may communicate wirelessly with a DeNB using a modified version of the E-UTRAN radio interface, called the "Un" interface.

A downlink signal may include a UE specific reference signal ("USRS"), which may be used by a UE device to demodulate downlink user and/or control data, and/or a common reference signal ("CRS") used to determine things like channel quality. Sometimes a downlink USRS is referred to as a "downlink demodulation reference signal ("DMRS"), particularly in Release 10 of LTE and beyond.

When an RN communicates with a DeNB over the Un interface, a relay physical downlink control channel ("R-PDCCH") may be multiplexed with a relay physical downlink shared channel ("R-PDSCH") in a physical resource block ("PRB") pair. However, in a non-interleaved R-PDCCH (e.g., mode 2), the Un interface's physical downlink shared channel ("PDSCH") transmission mode may be based on a USRS, rather than a CRS. In such cases, there may be either two {7, 8} or four {7, 8, 9, 10} logical antenna ports reserved, or "unused," for the USRS.

To determine whether two or four antenna ports are reserved for the USRS, it has been proposed that a bit may be added to a higher layer. This technique may save as many as six resource elements ("RE") per slot, and may reduce blind decoding complexity. However, it may require modification of the LTE Standard and may add a higher signaling transmission delay.

Alternatively, it has been proposed that, in a non-interleaved R-PDCCH, the maximum number of USRS ports (four) may be assumed to be used in the R-PDCCH. This technique may avoid the added overhead associated with higher-layer signaling, but may waste REs where only two antenna ports are unused. This technique also may increase blind decoding complexity because there may be a need for more rank format detection. Moreover, it may add a blind decoding delay for rank.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

FIG. 4 depicts an example table that may be used to map an index to a plurality of combination of physical downlink channel configurations, in accordance with various embodiments.

DETAILED DESCRIPTION

Figure 1:
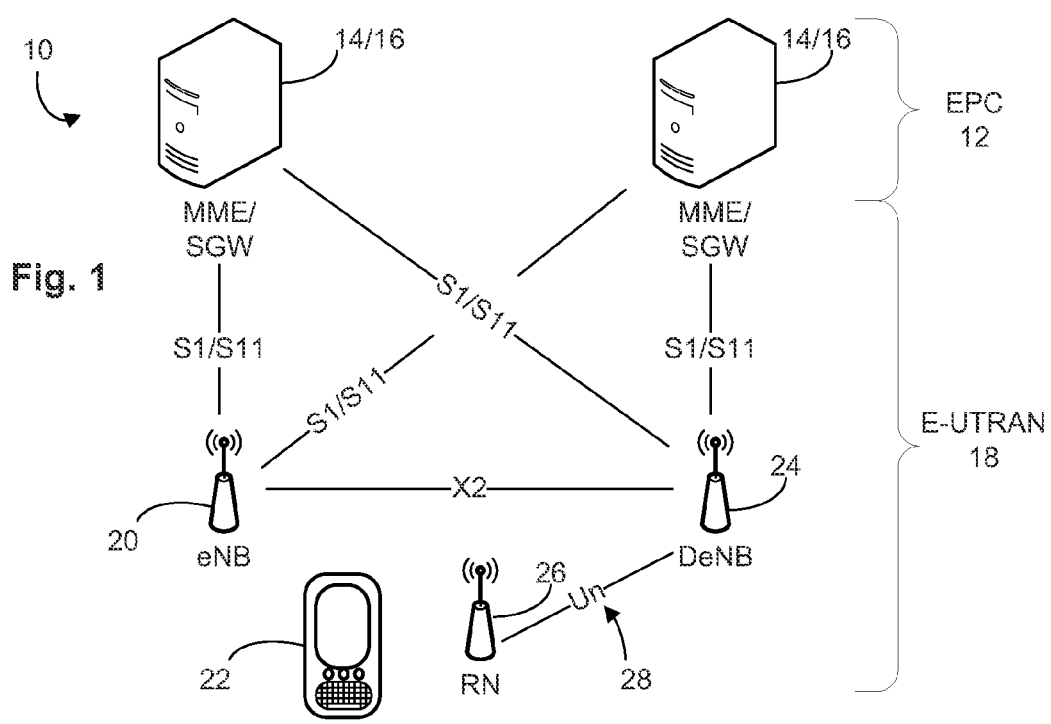
FIG. 1 schematically illustrates an example evolved packet system ("EPS"), in accordance with various embodiments.

In the following detailed description, reference is made to the accompanying drawings which form a part hereof wherein like numerals designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C).

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

As used herein, the term "module" may refer to, be part of, or include an Application Specific Integrated Circuit ("ASIC"), an electronic circuit, a processor (shared, dedicated, or group) and/or memory (shared, dedicated, or group) that execute one or more software or firmware programs, a combinational logic circuit, and/or other suitable components that provide the described functionality.

In various embodiments, a computer-implemented method may include receiving, by a processor of a relay node, a transmission of a series of symbols, including an index. Based on the index, the processor may determine a plurality of configurations of a physical downlink channel. The plurality of configurations of the physical downlink channel may include one or more antenna ports that are reserved for a reference signal. In some embodiments, the physical downlink channel may be a relay physical downlink control channel ("R-PDCCH").

In some embodiments, determining the plurality of configurations may include determining, by the processor, whether the R-PDCCH is interleaved. In some embodiments, determining the plurality of configurations may include determining, by the processor, a resource allocation type of the R-PDCCH. In some embodiments, determining the plurality of configurations may include determining, by the processor, a demodulation type of the R-PDCCH.

In some embodiments, determining the plurality of configurations may include determining, by the processor, whether the reference signal is a user equipment ("UE") specific reference signal ("USRS") or a common reference signal ("CRS"). In some embodiments, the one or more antenna ports may be antenna ports reserved for the USRS. In some embodiments, the index may be four bits long. Determining the plurality of configurations of the physical downlink channel may include determining, by the processor, three other physical downlink channel configurations in addition to the one or more antenna ports reserved for the reference signal.

In some embodiments, determining the plurality of configurations of the physical downlink channel may include matching, by the processor, the index to a first of a plurality of potential combinations of the plurality of configurations. In some embodiments, the index may be based at least in part on a codebookSubsetRestriction bitmap.

In some embodiments, a relay node ("RN") may include a wireless network adapter, a processor and a memory storing a plurality of potential combinations of a plurality of configurations of a physical downlink channel. The processor may be configured to receive, through the wireless network adapter, a transmission of a series of symbols, including an index. The processor may further be configured to match the index to one of the plurality of potential combinations.

In some embodiments, a donor evolved Node B ("DeNB") may include a wireless network adapter and a processor. The processor may be configured to generate a series of symbols for transmission. The series of symbols may include an index that is indicative of a plurality of configurations of a physical downlink channel, including one or more antenna ports that are reserved for a reference signal. The processor may further be configured to transmit, to an RN, through the wireless network adapter, the series of symbols.

In various embodiments, methods and/or non-transitory computer-readable media having a number of the above described operations may be practiced and/or executed. In various embodiments, apparatus and/or systems may be configured to practice such methods.

Referring to FIG. 1, an evolved packet system ("EPS") 10 in accordance with various embodiments may include an evolved packet core ("EPC") 12 with one or more mobile management entities ("MME") 14 and one or more SGWs 16. In FIG. 1, there are two computer systems in the EPC 12, each functioning as both an MME 14 and an SGW 16. EPS 10 may also include an evolved universal terrestrial radio access network ("E-UTRAN") 18 that includes one or more evolved Node Bs ("eNB") 20 to which a UE device 22 may connect. The UE device 22 also may connect to the E-UTRAN 18 via a DeNB 24 and an RN 26.

Various interfaces, described in the background, may exist between the various nodes of EPS 10. For example, the RN 26 and the DeNB 24 may communicate using, among other interfaces (not shown), an Un interface 28. The Un interface 28 may include various channels, including an R-PDCCH and relay physical downlink shared channel ("R-PDSCH").

Figure 2:
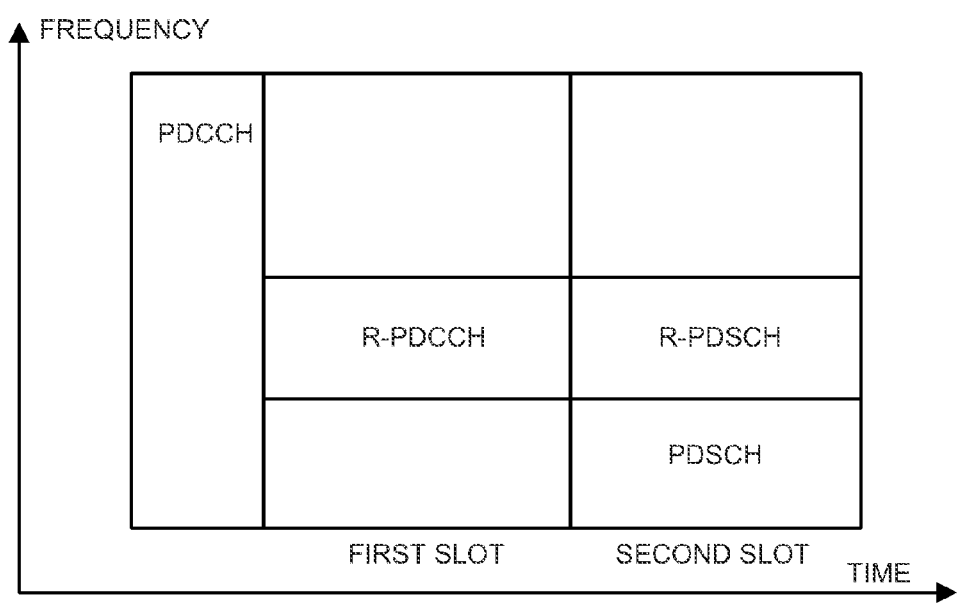
FIG. 2 schematically illustrates an example physical resource block ("PRB"), according to various embodiments of the disclosure.

Referring to FIG. 2, the R-PDCCH and R-PDSCH of the Un interface 28 may be multiplexed together in a PRB pair. The R-PDCCH may be in a first slot and the R-PDSCH may be in a second slot. While an R-PDSCH may include four antenna ports for a USRS, it may not be apparent whether two antenna ports (e.g., {7, 8}) or four antenna ports (e.g., {7, 8, 9, 10}) are reserved for the USRS of the R-PDCCH.

Rather than adding a signaling bit to a higher layer or always assuming four ports, as described in the background, combinations of existing channel configuration parameters may be jointly encoded and decoded so that, in addition to the information they previously conveyed, they also indicate a number of reserved antenna ports. For example, assume two parameters of one bit each and a third parameter of two bits are used separately to indicate three different channel configurations. With the three parameters encoded/decoded separately, only eight possible channel combinations ($2^3$) may be communicated. However, if the three parameters are jointly encoded/decoded as a single index, sixteen ($2^4$) possible channel configuration combinations may be communicated.

Figure 3:
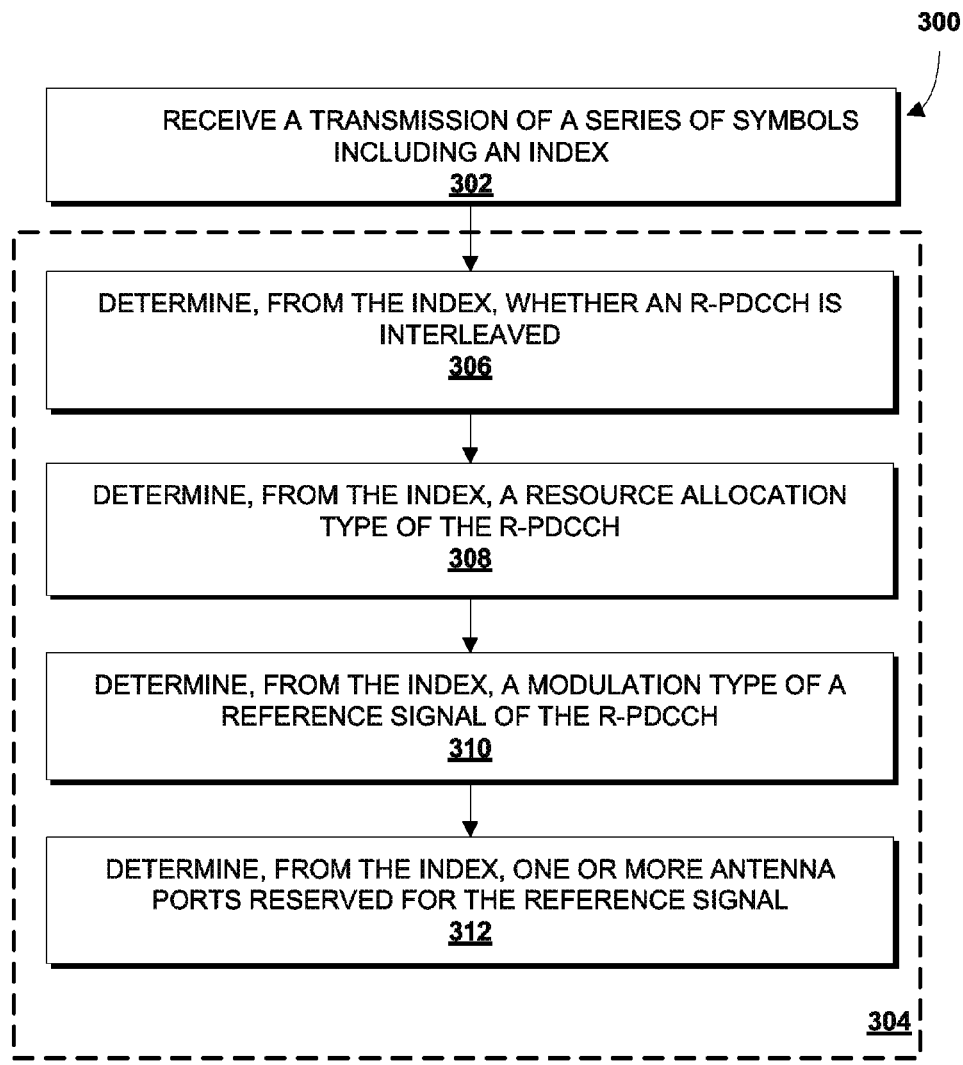
FIG. 3 schematically illustrates an example method of using an index to determine a plurality of physical downlink channel configurations, according to various embodiments of the disclosure.

FIG. 3 depicts an example method 300 of joint decoding that may be implemented by an RN, such as RN 26 in FIG. 1, to determine multiple configurations of a physical downlink channel such as the R-PDCCH. At 302, a transmission of a series of symbols, including an index, may be received, e.g., from a DeNB such as DeNB 24. At 304, the RN may determine, from the index, a plurality of configurations of a physical downlink channel based on the index. For example, at 306, the RN may determine, from the index, whether an R-PDCCH of a Un channel (e.g., 28) is interleaved. At 308, the RN may determine, from the same index, a resource allocation type of the R-PDCCH. At 310, the RN may determine, from the index, a modulation type (e.g., USRS or CRS) of the R-PDCCH. At 312, the RN may determine, again from the index, one or more antenna ports reserved for a reference signal of the R-PDCCH, such as the USRS.

An index may be used to determine multiple configurations of a channel in various ways. In some embodiments, such as those where the index has four bits, the index may be an index to a database table containing up to sixteen records of channel configuration combinations.

An example of this is shown in FIG. 4. The index has four bits, and can be any number from 0 to 15 (although index=15 is not used in this example). Three legacy channel configuration parameters are shown in headers of the middle columns to illustrate what information the bits forming the index would have conveyed in the prior art, and how those bits may now be used to form an index into the table. In this example the legacy channel configuration parameters include R-PDCCH-demodulationRs (one bit), which determines an R-PDCCH's modulation type, R-PDCCH-interleaved (one bit), which indicates whether an R-PDCCH is interleaved, and R-PDCCH-resourceAllocationType (two bits), which indicates orthogonal frequency division multiplexing ("OFDM") symbols for the R-PDCCH (e.g., 00→symbols 1-6; 01→symbols 2-6; 10→symbols 3-6). Another configuration of the channel, antenna ports reserved for a USRS, is shown in the right-most column.

Upon receiving a transmission of a series of symbols, including an index, from a DeNB, an RN may be configured to match the index to one of the plurality of potential combinations represented by the rows of the table of FIG. 4. For example, if an RN receives a transmission that includes an index with a value of 2 (0010), then the RN may refer to the table of FIG. 4 to determine that the modulation type of the R-PDCCH is USRS, the R-PDCCH is non-interleaved, its OFDM symbols are 3-6, and there are two antenna ports {7, 8} reserved for the USRS. As another example, if an RN receives a transmission that includes an index with a value of 14 (1110), then the RN may refer to the table of FIG. 4 to determine that the modulation type of the R-PDCCH is USRS, the R-PDCCH is non-interleaved, its OFDM symbols are 3-6, and there are four antenna ports ({7, 8, 9, 10}) reserved for the USRS.

Indications of channel configurations, including antenna ports for a USRS, may be encoded using parameters other than those shown in FIG. 4. For example, in various embodiments, parameters such as codebookSubsetRestriction may be used instead. codebookSubsetRestriction is a bitmap that specifies a precoder codebook subset in which a UE device may report various pieces of information, including as a precoding matrix indicator ("PMI"), a rank indication ("RI") and a precoding type indicator. In some embodiments, a codebook subset restriction value of 2 may indicate, in addition to what it normally indicates, that two antenna ports are reserved for the USRS. A value of 4 may indicate that four antenna ports are reserved for the USRS.

Just as RNs such as RN 26 may be configured to decode an index to determine combinations of channel configurations, nodes such as DeNB 24 may be configured to encode transmissions with indexes to communicate channel configurations.

Figure 5:
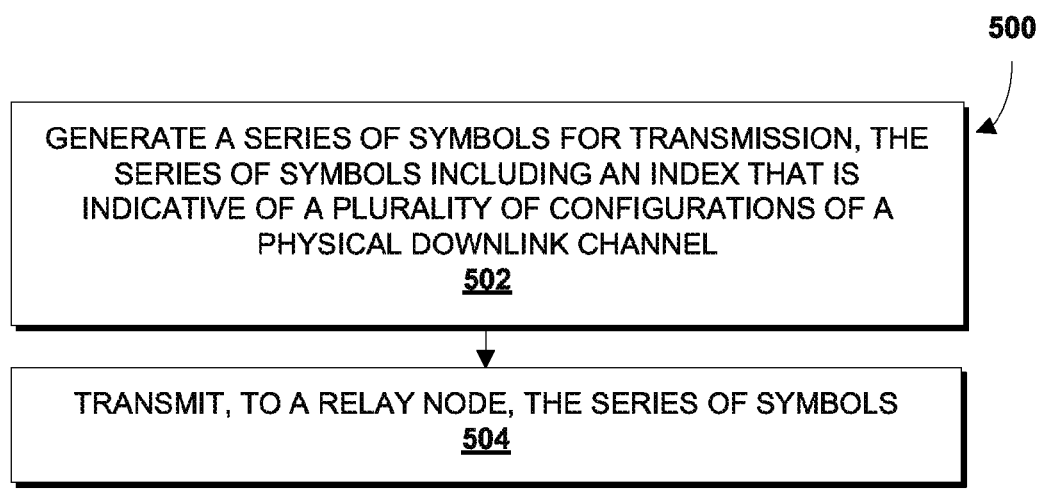
FIG. 5 schematically illustrates an example method of encoding an index indicative of a plurality of physical downlink channel configurations into a transmission, according to various embodiments of the disclosure.

For example, a method 500 depicted in FIG. 5 may be implemented by a DeNB, such as DeNB 24 in FIG. 1, to encode a transmission to an RN with an index. At 502, the DeNB may generate a series of symbols for transmission. The series of symbols may include an index that is indicative of a plurality of configurations of a physical downlink channel, including one or more antenna ports that are reserved for a reference signal. In some embodiments, the physical downlink channel may be an R-PDCCH. Similar as above, in some embodiments, the plurality of configurations indicated by the index may include one or more of whether the R-PDCCH is interleaved, a resource allocation type of the R-PDCCH, a demodulation type of the R-PDCCH, and one or more antenna ports reserved for a USRS. At 504, the DeNB may transmit, to an RN, the series of symbols.

Figure 6:
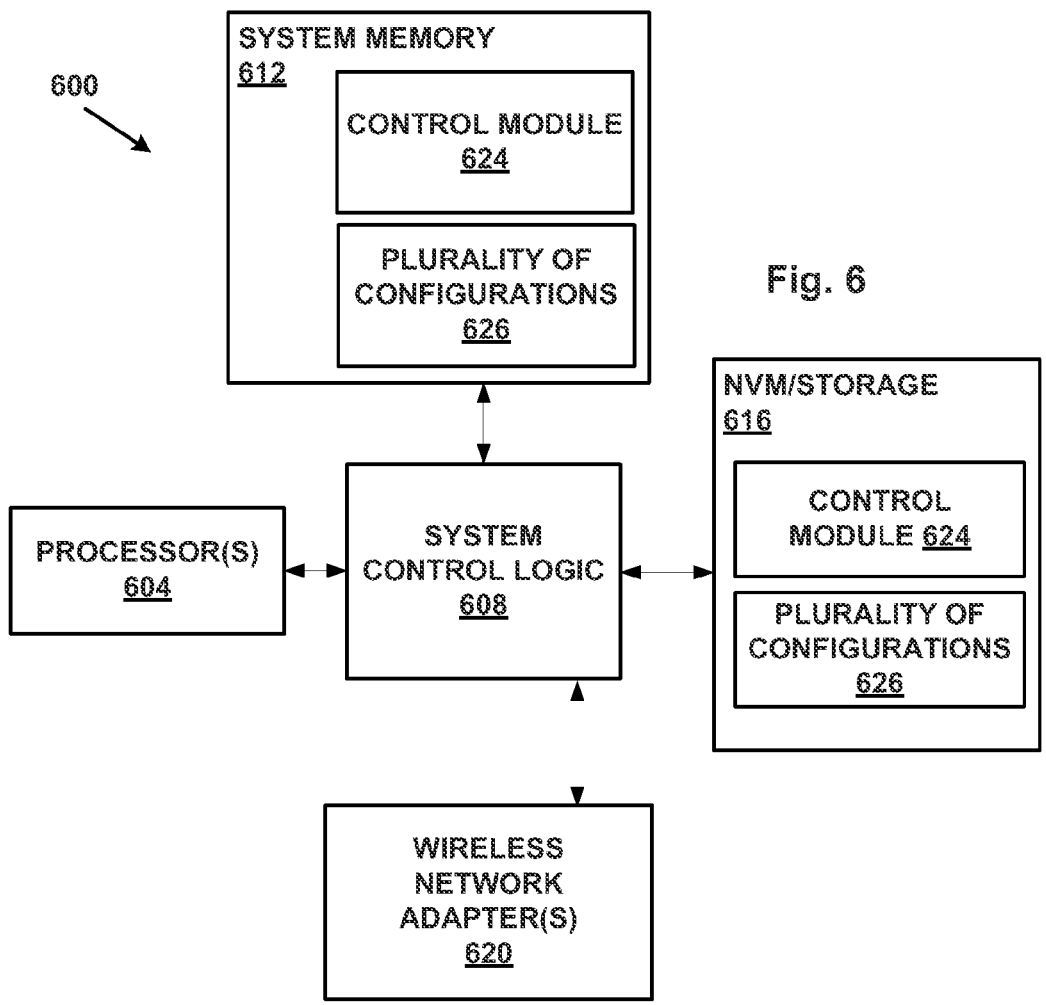
FIG. 6 depicts an example system that may be used to implement various disclosed methods, in accordance with various embodiments.

The techniques and apparatuses described herein may be implemented into a system using suitable hardware and/or software to configure as desired. FIG. 6 illustrates, for one embodiment, an example system 600 comprising one or more processor(s) 604, system control logic 608 coupled to at least one of the processor(s) 604, system memory 612 coupled to system control logic 608, non-volatile memory (NVM)/storage 616 coupled to system control logic 608, and one or more communications interface(s) 620 coupled to system control logic 608.

System control logic 608 for one embodiment may include any suitable interface controllers to provide for any suitable interface to at least one of the processor(s) 604 and/or to any suitable device or component in communication with system control logic 608.

System control logic 608 for one embodiment may include one or more memory controller(s) to provide an interface to system memory 612. System memory 612 may be used to load and store data and/or instructions, for example, for system 600. System memory 612 for one embodiment may include any suitable volatile memory, such as suitable dynamic random access memory ("DRAM"), for example.

System control logic 608 for one embodiment may include one or more input/output ("I/O") controller(s) to provide an interface to NVM/storage 616 and a wireless network adaptor(s) 620.

NVM/storage 616 may be used to store data and/or instructions, for example. NVM/storage 616 may include any suitable non-volatile memory, such as flash memory, for example, and/or may include any suitable non-volatile storage device(s), such as one or more hard disk drive(s) ("HDD"(s)), one or more solid-state drive(s), one or more compact disc ("CD") drive(s), and/or one or more digital versatile disc (DVD) drive(s) for example.

The NVM/storage 616 may include a storage resource physically part of a device on which the system 600 is installed or it may be accessible by, but not necessarily a part of, the device. For example, the NVM/storage 616 may be accessed over a network via the wireless network adaptor(s) 620.

System memory 612 and NVM/storage 616 may include, in particular, temporal and persistent copies of control module 624, respectively. In various embodiments, system memory 612 and NVM/storage 616 may also store, as indicated at 626, a plurality of potential combinations of a plurality of configurations of a physical downlink channel. In some embodiments the plurality of potential channel configurations 626 may be in the form of a table such as that shown in FIG. 4. The control module 624 may include instructions that when executed by at least one of the processor(s) 604 result in the system 600 using an index and a stored plurality of potential channel configurations 626 to encode a transmission with an index (where system 600 is a DeNB) and determine channel configurations by decoding an index of a channel (where system is a RN), as described above. In some embodiments, the control module 624 may additionally/alternatively be located in the system control logic 608 and/or wireless network adapter 620.

Wireless network adaptor(s) 620 may provide an interface for system 600 to communicate over one or more network(s) and/or with any other suitable device. Wireless network adaptor (s) 620 may include any suitable hardware and/or firmware. The wireless network adaptor (s) 620 may use one or more antenna(s).

For one embodiment, at least one of the processor(s) 604 may be packaged together with logic for one or more controller(s) of system control logic 608. For one embodiment, at least one of the processor(s) 604 may be packaged together with logic for one or more controllers of system control logic 608 to form a System in Package ("SiP"). For one embodiment, at least one of the processor(s) 604 may be integrated on the same die with logic for one or more controller(s) of system control logic 608. For one embodiment, at least one of the processor(s) 604 may be integrated on the same die with logic for one or more controller(s) of system control logic 608 to form a System on Chip ("SoC").

The system 600 may be a various nodes in an EPS, such as an RN or a DeNB, as well as a desktop or laptop computer, a mobile telephone, a smart phone, or any other device adapted to receive a wireless communication signal. In various embodiments, system 600 may have more or less components, and/or different architectures.

Although certain embodiments have been illustrated and described herein for purposes of description, a wide variety of alternate and/or equivalent embodiments or implementations calculated to achieve the same purposes may be substituted for the embodiments shown and described without departing from the scope of the present disclosure. This application is intended to cover any adaptations or variations of the embodiments discussed herein. Therefore, it is manifestly intended that embodiments described herein be limited only by the claims and the equivalents thereof.

What is claimed is:

1. A computer-implemented method, comprising:
   receiving, by a processor of a relay node ("RN"), a transmission of a series of symbols, including an index value, wherein the index value jointly encodes a plurality of channel configuration parameters; and
   determining, by the processor, the plurality of channel configuration parameters of a relay physical downlink control channel ("R-PDCCH") based on the index value;
   wherein the plurality of channel configuration parameters of the R-PDCCH includes a parameter specifying which of one or more antenna ports are reserved for a reference signal, and also includes one or more additional channel configuration parameters.

2. The computer-implemented method of claim 1, wherein determining the plurality of channel configuration parameters includes determining, by the processor, whether the R-PDCCH is interleaved.

3. The computer-implemented method of claim 1, wherein determining the plurality of channel configuration parameters includes determining, by the processor, a resource allocation type of the R-PDCCH.

4. The computer-implemented method of claim 1, wherein determining the plurality of channel configuration parameters includes determining, by the processor, a demodulation type of the R-PDCCH.

5. The computer-implemented method of claim 1, wherein determining the plurality of channel configuration parameters includes determining, by the processor, whether the reference signal is a UE specific reference signal ("USRS") or a common reference signal ("CRS").

6. The computer-implemented method of claim 5, wherein the one or more antenna ports are antenna ports reserved for the USRS.

7. The computer-implemented method of claim 1, wherein the index value is four bits long, and determining the plurality of channel configuration parameters of the R-PDCCH includes determining, by the processor, three other R-PDCCH channel configuration parameters in addition to the parameter specifying which of the one or more antenna ports are reserved for the reference signal.

8. The computer-implemented method of claim 1, wherein determining the plurality of channel configuration parameters of the R-PDCCH includes matching, by the processor, the index value to a first of a plurality of potential combinations of channel configuration parameters in a table of channel configuration parameter combinations.

9. The computer-implemented method of claim 1, wherein the index is based at least in part on a codebookSubsetRestriction bitmap.

10. A relay node ("RN") comprising:
    a wireless network adapter;
    a processor;
    a memory storing a plurality of potential combinations of a plurality of channel configuration parameters of a physical downlink channel, each combination corresponding to a value of an index;
    wherein the processor is configured to:
      receive, through the wireless network adapter, from a donor evolved NodeB ("DeNB"), a transmission of a series of symbols, including an index value; and
      match the index value to the corresponding one of the plurality of potential combinations to configure the physical downlink channel in accordance with the plurality of channel configuration parameters of the matched combination.

11. The RN of claim 10, wherein the physical downlink channel is a relay physical downlink control channel ("R-PDCCH").

12. The RN of claim 11, wherein the plurality of configuration parameters includes whether the R-PDCCH is interleaved.

13. The RN of claim 11, wherein the plurality of channel configuration parameters includes a resource allocation type of the R-PDCCH.

14. The RN of claim 11, wherein the plurality of channel configuration parameters includes a demodulation type of the R-PDCCH.

15. The RN of claim 11, wherein the plurality of channel configuration parameters includes whether the reference signal is a UE specific reference signal ("USRS") or a common reference signal ("CRS").

16. The RN of claim 15, wherein the plurality of channel configuration parameters includes a parameter specifying which of one or more antenna ports are reserved for the USRS.

17. The RN of claim 10, wherein the index is four bits long, and the plurality of channel configuration parameters of the physical downlink channel includes four configuration parameters.

18. The RN of claim 10, wherein the index is based at least in part on a codebookSubsetRestriction bitmap.

19. A donor evolved NodeB ("DeNB") comprising:
    a wireless network adapter; and
    a processor configured to:
      generate a series of symbols for transmission, the series of symbols including an index that jointly encodes a combination of a plurality of channel configuration parameters of a physical downlink channel, including a parameter specifying which of one or more antenna ports are reserved for a reference signal and further including one or more additional channel configuration parameters; and transmit, to a relay node ("RN"), through the wireless network adapter, the series of symbols.

20. The DeNB of claim 19, wherein the physical downlink channel is a relay physical downlink control channel ("R-PDCCH").

21. The DeNB of claim 20, wherein the plurality of channel configuration parameters includes whether the R-PDCCH is interleaved.

22. The DeNB of claim 20, wherein the plurality of channel configuration parameters includes a resource allocation type of the R-PDCCH.

23. The DeNB of claim 20, wherein the plurality of channel configuration parameters includes a demodulation type of the R-PDCCH.

24. The DeNB of claim 20, wherein the plurality of channel configuration parameters includes whether the reference signal is a UE specific reference signal ("USRS") or a common reference signal ("CRS").

25. The DeNB of claim 24, wherein the plurality of channel configuration parameters includes a parameter specifying which of one or more antenna ports are reserved for the USRS.

26. The DeNB of claim 19, wherein the index is four bits long, and the plurality of channel configuration parameters of the physical downlink channel includes four channel configuration parameters.

27. The DeNB of claim 19, wherein the index is based at least in part on a codebookSubsetRestriction bitmap.

28. A computer-implemented method, comprising:
generating, by a donor evolved NodeB ("DeNB"), a series of symbols for transmission, the series of symbols including an index that jointly encodes a combination of a plurality of channel configuration parameters of a physical downlink channel, including a parameter specifying which of one or more antenna ports are reserved for a user equipment ("UE") specific reference signal ("USRS") and further including one or more additional channel configuration parameters; and
transmitting, by the DeNB, to a relay node ("RN"), the series of symbols.

29. The computer-implemented method of claim 28, wherein the plurality of channel configuration parameters includes one or more of whether the physical downlink channel is interleaved, a resource allocation type of the physical downlink channel, or a demodulation type of the physical downlink channel.

* * * * *